(12) United States Patent  
Garay et al.

(10) Patent No.: US 9,285,123 B2
(45) Date of Patent: Mar. 15, 2016

(54) BURNER SYSTEM WITH STAGED FUEL INJECTION

(75) Inventors: Mauricio Ernesto Garay, Las Heras Mendoza (AR); Stefano Bernero, Oberrohrdorf (CH); Bruno Schuermans, Basel (CH); Martin Zajadatz, Kuessaberg/Dangstetten (DE)

(73) Assignee: ALSTOM TECHNOLOGY LTD, Baden (CH)

( * ) Notice: Subject to any disclaimer, the term of this patent is extended or adjusted under 35 U.S.C. 154(b) by 2680 days.

(21) Appl. No.: 11/693,951

(22) Filed: Mar. 30, 2007

(65) Prior Publication Data

US 2007/0238059 A1    Oct. 11, 2007

(30) Foreign Application Priority Data

Mar. 31, 2006   (DE) .................... 10 2006 015 529

(51) Int. Cl.
| | |
|---|---|
| F23D 17/00 | (2006.01) |
| F23R 3/34 | (2006.01) |
| F02C 7/228 | (2006.01) |
| F02C 9/34 | (2006.01) |
| F02C 9/40 | (2006.01) |
| F23N 5/02 | (2006.01) |
| F23R 3/36 | (2006.01) |

(52) U.S. Cl.
CPC ............. *F23R 3/346* (2013.01); *F02C 7/228* (2013.01); *F02C 9/34* (2013.01); *F02C 9/40* (2013.01); *F23N 5/022* (2013.01); *F23R 3/36* (2013.01); *F23N 2025/04* (2013.01); *F23N 2025/06* (2013.01); *F23N 2025/26* (2013.01); *F23N 2037/02* (2013.01)

(58) Field of Classification Search
USPC .......................... 431/37, 19, 75, 10
See application file for complete search history.

(56) References Cited

U.S. PATENT DOCUMENTS

| | | | | |
|---|---|---|---|---|
| 4,913,647 | A | * | 4/1990 | Bonne et al. ................... 431/12 |
| 5,284,438 | A | * | 2/1994 | McGill et al. ................... 431/9 |
| 5,520,534 | A | | 5/1996 | Nakagawa et al. |
| 5,605,452 | A | * | 2/1997 | Robertson et al. ............. 431/8 |

(Continued)

FOREIGN PATENT DOCUMENTS

| | | |
|---|---|---|
| DE | 9421866 | 1/1997 |
| DE | 19610930 | 9/1997 |

(Continued)

OTHER PUBLICATIONS

Brief translation of German Search Report for DE 10 2006 015 529.7 mailed Feb. 12, 2007.

(Continued)

*Primary Examiner* — Avinash Savani
(74) *Attorney, Agent, or Firm* — Buchanan Ingersoll & Rooney PC

(57) ABSTRACT

A burner system with staged fuel injection includes at least one burner with a mixing zone. A combustion chamber is disposed downstream of the mixing zone and a first fuel introduction device is provided upstream of the mixing zone. Furthermore, a second fuel introduction device for the direct injection of fuel into the combustion chamber, is disposed downstream of the mixing zone. In addition, at least one sensor for determining combustion parameters is connected to a control device. The control device is designed to control the second fuel introduction device as a function of the parameters determined by the sensors.

16 Claims, 1 Drawing Sheet

(56) References Cited

U.S. PATENT DOCUMENTS

| | | | | |
|---|---|---|---|---|
| 5,662,465 | A | * | 9/1997 | Kano ................. 431/12 |
| 6,558,154 | B2 | * | 5/2003 | Eroglu et al. ............ 431/8 |
| 7,003,960 | B2 | * | 2/2006 | Eroglu ................. 60/776 |
| 7,303,388 | B2 | * | 12/2007 | Joshi et al. ............ 431/10 |
| 7,549,857 | B2 | | 6/2009 | Gutmark et al. |
| 2005/0019713 | A1 | | 1/2005 | Gutmark et al. |
| 2005/0175948 | A1 | * | 8/2005 | Pennell et al. .......... 431/350 |

FOREIGN PATENT DOCUMENTS

| | | |
|---|---|---|
| DE | 19828111 | 2/1999 |
| DE | 69329021 | 11/2000 |
| DE | 102004015187 | 10/2005 |
| DE | 102005011287 | 11/2005 |
| EP | 1 429 004 A2 | 6/2004 |
| JP | 49129925 A | 12/1974 |
| JP | 56-132419 A | 10/1981 |
| JP | 60-21829 U | 2/1985 |
| JP | 11-14013 A | 1/1999 |
| JP | 2005195214 A | 7/2005 |

OTHER PUBLICATIONS

The Extended European Search Report issued on Sep. 24, 2014, by the European Patent Office in corresponding European Patent Application No. 07101562.2-1503 (6 pgs).

Decision of Refusal issued Jan. 14, 2014 by the Japanese Patent Office in corresponding Japanese Patent Application No. 2007-088408, and an English translation thereof (6 pages).

* cited by examiner

BURNER SYSTEM WITH STAGED FUEL INJECTION

Priority is claimed to German Patent Application No. DE 10 2006 015 529.7, filed on Mar. 31, 2006, the entire disclosure of which is incorporated by reference herein.

The present invention relates to a burner system with staged fuel injection and to a method for controlling a burner system of this type.

BACKGROUND

The increasingly stringent regulations governing pollutant emission limits are compelling power plant operators to operate the burners of the power plants as far as possible in lean-burn mode, i.e. with a considerable excess of oxidizing agent, generally air. The lean-burn operation makes it possible in particular to reduce the formation of particularly harmful $NO_x$ emissions and at the same time to move the combustion reaction close to its lean extinction limit. Operating a combustion installation close to its lean extinction limit, although on the one hand leading to low pollutant emission levels, on the other hand also conceals the risk of the flame being extinguished as a result of pulsating pressures, with the result that correct operation of the combustion installation is no longer ensured. To counteract this, it is generally accepted that the combustion installation has to be operated with a sufficient safety margin with respect to the lean extinction limit, which means accepting the resulting higher pollutant emissions.

SUMMARY OF THE INVENTION

The present invention addresses the problem of, on the one hand operating a burner system as close as possible to the lean extinction limit and therefore with minimum possible pollutant emissions, and on the other hand of avoiding extinction of the flame in the burner system.

The present invention is based on the general concept of providing a first and a second fuel introduction device in a burner system with staged fuel injection and of providing a control device which controls the second fuel introduction device as a function of parameters relevant to combustion which are determined in the combustion chamber. The burner system comprises a burner with a mixing zone and a combustion chamber located downstream of this mixing zone. The first fuel introduction device is arranged upstream of the mixing zone, while the second fuel introduction device lies downstream of the mixing zone and can introduce fuel directly into the combustion chamber. According to the invention, the burner system also comprises at least one sensor for determining the abovementioned combustion parameters, with the at least one sensor being in communication with an input side of the control device. On the output side, the control device is in communication with the second fuel introduction device, so that the control device can evaluate the parameters determined in the combustion chamber and preferably compare them with a predetermined desired value, and in the event of deviations from this desired value it controls the second fuel introduction device accordingly. Therefore, the control device can be used to directly influence the second fuel introduction device as a function of the parameters which have been determined, while the first fuel introduction device, unaffected by the above, can continue to introduce fuel into the mixing zone or into the inflow region of the burner.

In an advantageous refinement of the solution according to the invention, the second fuel introduction device is either formed at an exit side of the burner or is arranged separately from the burner in a combustion chamber wall. If it is arranged in a combustion chamber wall, it is preferable to opt for the same wall as the one in which the exit side of the burner is also located. In the case of a plurality of burners, it is of course also possible for the second fuel introduction device for a group of burners to be formed at the exit side of the burner while the second fuel introduction device for another group of burners is positioned separately from the burners in the combustion chamber wall. These examples already make it clear that the invention permits positioning of the second fuel introduction device which can be individually adapted to particular types of burner, with the result that a high degree of flexibility and a wide spectrum of use for the burner system according to the invention can be achieved.

It is expedient for the burner system to comprise a plurality of burners which can optionally be controlled in groups or individually by the control device. Therefore, depending on the desired level of control, it is possible for all the burners provided in the burner system to be actuated individually or for the burners to be combined in groups of the same or different size, in which case the control device can control groups of burners. As a result, it is possible for the burner system to be reliably operated close to the lean extinction limit without all the burners located in the burner system having to be connected to the control device.

In a further advantageous embodiment of the solution according to the invention, the burner system has burners without a second fuel introduction device and/or burners with a second fuel introduction device formed in a ring and/or burners with at least one associated fuel nozzle in the combustion chamber wall. This exemplary embodiment demonstrates that the burner system according to the invention may both have burners with a differently configured second fuel device and permits the provision of conventional burners without a second fuel introduction device. This offers the major advantage that, for example, conventional combustion installations can be retrofitted with the burner system according to the invention or the burners according to the invention, in which case it is only necessary for individual burners to be replaced or exchanged.

In a preferred refinement of the invention, the at least one sensor is designed to detect at least one of the following parameters: temperature, moisture content, through-flow rate, pressure, fuel composition. Sensors for determining the abovementioned parameters are nowadays inexpensive to produce and allow extensive monitoring of the combustion process in the combustion chamber. Since, for example, the fuel does not always have precisely the same composition, it is important to determine corresponding deviations and to take suitable measures to remedy such deviations. For example, if the fuel composition changes, the sensor recognizes this and transmits the parameters recorded to the control device, which evaluates the parameters and compares them with predetermined desired values, after which it actuates the second fuel introduction device accordingly. In this context, different sensors, which preferably record all the combustion parameters and therefore allow precise recording of the combustion process, are conceivable.

Further important features and advantages of the operating method according to the invention will emerge from the claims, from the drawings and from the associated descriptions of figures with reference to the drawings.

BRIEF DESCRIPTION OF THE DRAWINGS

Preferred exemplary embodiments of the invention are illustrated in the drawings and explained in more detail in the description which follows, in which identical reference designations relate to identical or similar or functionally equivalent components. In the drawings.

DETAILED DESCRIPTION

Figure 1:
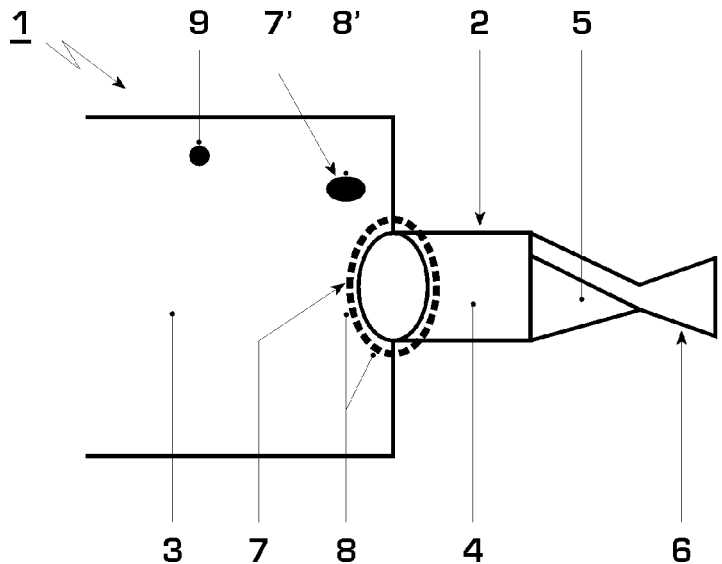
FIG. 1 shows a highly schematic illustration of a burner according to the invention.

In accordance with FIG. 1, a burner system 1 according to the invention with staged fuel injection has at least one burner 2. A combustion chamber 3, a mixing zone 4 and an inflow region 5 of the burner 2 are arranged from left to right in FIG. 1. The inflow region 5 may, for example, be designed as a swirl generator and may impart a swirling movement to the fuel/air mixture flowing into the mixing zone 4. By way of example, a gas turbine (not shown) may be located downstream of the combustion chamber 3.

A first fuel introduction device 6, which passes fuel into the inflow region 5, is arranged in the inflow region 5 or downstream of the mixing zone 4. According to the invention, a second fuel introduction device 7, which is designed for the direct injection or introduction of fuel into the combustion chamber 3, is arranged downstream of the mixing zone 4. FIG. 1 illustrates two different types of the second fuel introduction device 7 or 7', the fuel introduction device 7' having at least one fuel nozzle 8', while the fuel introduction device 7 has a plurality of nozzles 8 arranged preferably in the form of a ring at the burner exit or at the exit of the mixing zone 4, by which the fuel can be injected into the combustion chamber 3. The second fuel introduction device 7 is therefore arranged or formed at the exit side of the burner 2 while the second fuel device 7' is arranged separately from the burner 2 in a combustion chamber wall. Both the exit of the burner 2 and the second fuel introduction device 7' preferably lie in the same combustion chamber wall, for example the end wall of the combustion chamber 3.

As can also been seen from FIG. 1, at least one sensor 9 for determining combustion parameters, for example a combustion temperature, a moisture content, a through-flow rate, a combustion chamber pressure or a fuel composition, is arranged at a suitable location in the combustion chamber 3. The at least one sensor 9 delivers the parameters which are relevant to the combustion process and which can be used to estimate the quality of the combustion process. FIG. 1, by way of example, illustrates just one sensor 9; of course, it is conceivable for a plurality of sensors to be arranged in the region of the combustion chamber 3 in order to record different parameters, thereby allowing a wide range of combustion parameters to be determined.

Figure 2:
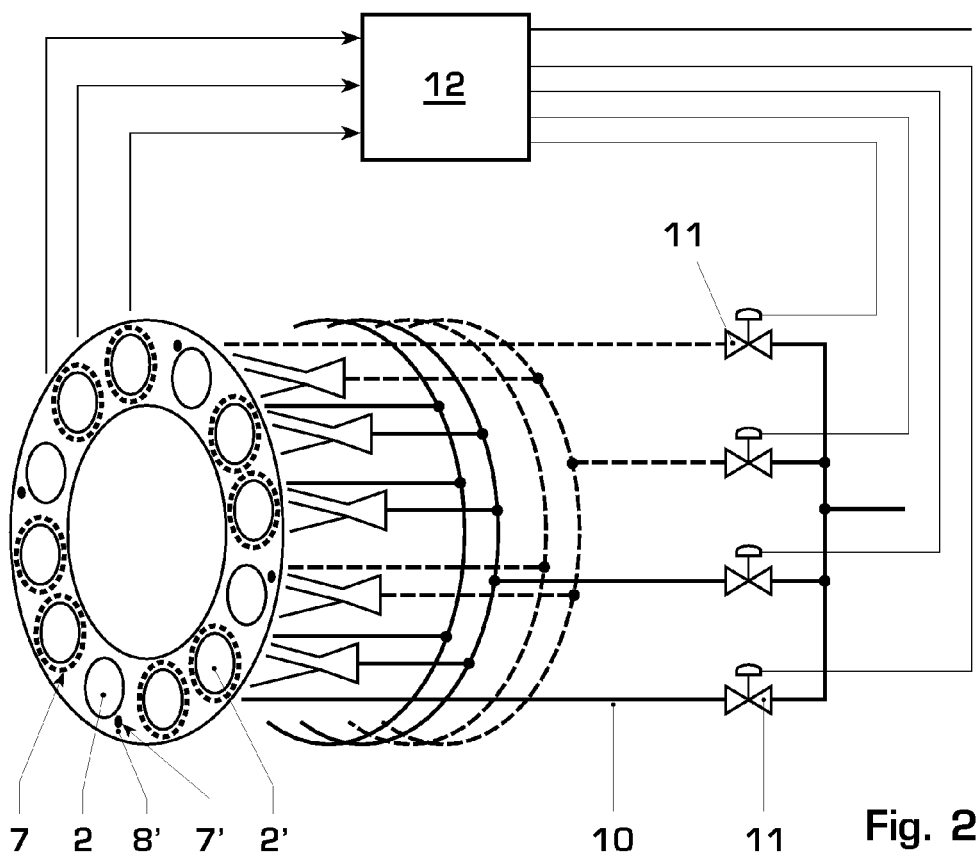
FIG. 2 shows a highly schematic illustration of a burner system according to the invention with a plurality of burners.

In accordance with FIG. 2, a plurality of burners 2, for example twelve as illustrated here, are arranged in the form of a ring, so that the burner system 1 according to the invention as shown in FIG. 2 comprises a total of twelve burners 2. In this case, as shown in FIG. 2, four burners 2 have a second fuel introduction device 7' which is arranged separately from the respective burner 2 in the combustion chamber wall, while a total of eight burners 2' each have a second fuel introduction device 7 which are formed in the outlet region of the respective burners 2'.

Both the first fuel introduction devices 6 and the second fuel introduction devices 7 are fed via respectively associated fuel lines 10, which as shown in FIG. 2 are provided with valves 11 which can be actuated by a control device 12. The control device 12 is connected on the input side to at least one, and in accordance with FIG. 2 in total three sensors 9, while on the output side it is in communication with the valves 11. According to the invention, the control device 12 is formed in such a manner that it can control the second fuel introduction devices 7, 7' as a function of the parameters determined by the sensors 9. In this context, it is also conceivable for the individual burners 2 to be combined in groups, so that they can be controlled in groups by the control device 12, or alternatively for the burners 2 to be controlled individually by means of the control device 12. Furthermore, it is conceivable for all the second fuel introduction devices 7, 7' to be controlled simultaneously, i.e. uniformly, by the control device 12.

As shown in FIG. 2, the burner system 1 according to the invention may have both burners 2 which each have at least one associated fuel nozzle 8' and burners 2' which each have a second fuel introduction device 7 which is in each case in the form of a ring. Furthermore, it is conceivable for conventional burners without a second fuel introduction device 7 also to be arranged in the burner system 1 according to the invention. In principle, the control device 12 is designed in such a way that it can control the first fuel introduction device 6 independently of the parameters determined by the sensors 9, so that in particular it is conceivable for the second introduction devices 7, 7' to be supplied via separate fuel lines 10 and, for example, to be able to introduce other fuels, i.e. fuels that are different than the first fuel introduction devices 6, into the combustion chamber 3.

The text which follows will now provide a brief explanation of a method for controlling the burner system 1 according to the invention with staged fuel injection. When the burner system 1 according to the invention is operating, the at least one sensor 9 continuously or at least temporarily determines parameters which occur in the combustion chamber 3 and are of relevance to the combustion. These parameters which have been determined are transmitted by the at least one sensor 9 to the control device 12, which compares them with predetermined desired values and correspondingly actuates valves 11 and therefore the second fuel introduction devices 7, 7'. This can be embodied for example by the valves being opened when the lean extinction limit is reached. In this case, the control device 12 with the at least one sensor 9 forms a closed-loop control circuit.

What is claimed is:

1. A burner system with staged fuel injection, comprising:
   at least one burner with an inflow region for receiving a combustion air stream and a mixing zone disposed downstream of the inflow region;
   a combustion chamber disposed downstream of the mixing zone;
   a first fuel introduction device disposed upstream of the mixing zone;
   a second fuel introduction device disposed downstream of the mixing zone configured for direct injection of fuel into the combustion chamber;
   a sensor configured to determine at least one combustion parameter,
   a control device connected to the sensor and the second fuel introduction device and configured to control the second fuel introduction device as a function of the at least one determined parameter.

2. The burner system as recited in claim 1, wherein the second fuel introduction device is disposed at one of an exit side of the burner and separately from the burner in a combustion chamber wall.

3. The burner system as recited in claim 1, wherein the at least one parameter includes at least one of: a temperature, a moisture content, a through-flow rate, a pressure, and a fuel composition.

4. The burner system as recited in claim 1, further comprising separate first and second fuel lines each connected to a respective one the first and second fuel introduction devices.

5. The burner system as recited in claim 1, wherein the first and second fuel introduction devices are each configured for introducing a different type of fuel.

6. The burner system as recited in claim 1, wherein the at least one burner includes a plurality of burners controlled individually or in groups using the control device.

7. The burner system as recited in claim 1, wherein the second fuel introduction device has at least one fuel nozzle configured to inject the fuel into the combustion chamber.

8. A burner system with staged fuel injection, comprising:
   at least one burner with an inflow region for receiving a combustion air stream and a mixing zone disposed downstream of the inflow region;
   a combustion chamber disposed downstream of the mixing zone;
   a first fuel introduction device disposed upstream of the mixing zone;
   a second fuel introduction device disposed downstream of the mixing zone configured for direct injection of fuel into the combustion chamber;
   a sensor configured to determine at least one combustion parameter, and
   a control device connected to the sensor and the second fuel introduction device and configured to control the second fuel introduction device as a function of the at least one determined parameter,
   wherein the second fuel introduction device has at least one fuel nozzle configured to inject the fuel into the combustion chamber, and
   wherein the at least one fuel nozzle includes a plurality of fuel nozzles disposed in a ring at an exit of the burner and each fuel nozzle is configured to inject the fuel into the combustion chamber.

9. The burner system as recited in claim 6, wherein at least one of the plurality of burners is not associated with a respective second fuel introduction device.

10. The burner system as recited in claim 6, wherein at least one of the plurality of burners is associated with a further second fuel introduction device.

11. The burner system as recited in claim 10, wherein the further second fuel introduction device includes one of a single fuel nozzle disposed in the combustion chamber wall and a plurality of fuel nozzles disposed in a ring at an exit to the burner.

12. The burner system as recited in claim 1, wherein the control device is configured to control the first fuel introduction device independently of the at least one determined parameters.

13. The burner system as recited in claim 1, wherein the inflow includes a swirl generator.

14. A method for controlling a burner system with staged fuel injection, comprising:
   introducing a combustion air stream to an inflow region of a burner and flowing the combustion air to a mixing zone of the burner disposed downstream of the inflow region;
   flowing the combustion air stream to a combustion chamber disposed downstream of the mixing zone;
   introducing a first fuel to the combustion stream using a first fuel introduction device disposed upstream of the mixing zone;
   directly injecting a second fuel into the combustion chamber using a second fuel introduction device disposed downstream of the mixing, zone;
   determining at least one combustion parameter using a sensor; and
   controlling the second fuel introduction device as a function of the at least one combustion parameter.

15. The method as recited in claim 14, wherein the first and second fuels are the same fuel type.

16. The method as recited in claim 14, wherein the control device with the at least one sensor forms a closed-loop control circuit.

* * * * *